(12) United States Patent
Peng et al.

(10) Patent No.: US 11,050,292 B2
(45) Date of Patent: Jun. 29, 2021

(54) REDUNDANT POWER TRANSFER APPARATUS AND CONTROL METHODS

(71) Applicant: DELTA ELECTRONICS, INC., Taoyuan (TW)

(72) Inventors: Te-Chih Peng, Taoyuan (TW); Ming-Hsiang Lo, Taoyuan (TW); Chia-Hao Chang, Taoyuan (TW)

(73) Assignee: DELTA ELECTRONICS INC., Taoyuan (TW)

( * ) Notice: Subject to any disclaimer, the term of this patent is extended or adjusted under 35 U.S.C. 154(b) by 124 days.

(21) Appl. No.: 16/227,323

(22) Filed: Dec. 20, 2018

(65) Prior Publication Data
US 2020/0076228 A1 Mar. 5, 2020

(30) Foreign Application Priority Data
Aug. 30, 2018 (CN) .......................... 201811002986.0

(51) Int. Cl.
*H02J 9/06* (2006.01)
*H02J 3/18* (2006.01)

(52) U.S. Cl.
CPC . *H02J 9/06* (2013.01); *H02J 3/18* (2013.01); *H02J 9/068* (2020.01)

(58) Field of Classification Search
CPC .................. H02J 9/06; H02J 3/18; H02J 9/068
USPC ............................................................ 307/64
See application file for complete search history.

(56) References Cited

U.S. PATENT DOCUMENTS

| | | | | |
|---|---|---|---|---|
| 4,788,449 A * | 11/1988 | Katz | .......................... | H02J 1/10 136/244 |
| 9,559,607 B1 * | 1/2017 | Wang | ..................... | H02J 3/0073 |
| 2006/0226706 A1 * | 10/2006 | Edelen | ..................... | H02J 9/062 307/64 |
| 2011/0090604 A1 * | 4/2011 | Butler | ........................ | G05F 1/44 361/18 |
| 2011/0225452 A1 | 9/2011 | Duan et al. | | |
| 2013/0235492 A1 * | 9/2013 | Zhou | ....................... | H01H 9/542 361/18 |
| 2014/0077602 A1 * | 3/2014 | Liu | .......................... | H02J 1/102 307/64 |
| 2015/0123473 A1 * | 5/2015 | Braylovskiy | ........... | H02J 1/102 307/23 |
| 2018/0076731 A1 | 3/2018 | Morin | | |

FOREIGN PATENT DOCUMENTS

| | | |
|---|---|---|
| TW | 201217950 A | 5/2012 |
| TW | 201407929 A | 2/2014 |
| TW | 201605151 A | 2/2016 |

OTHER PUBLICATIONS

Office Action issued in corresponding TW patent application No. 107130237 dated Jun. 4, 2019.

* cited by examiner

*Primary Examiner* — Daniel Kessie
*Assistant Examiner* — Brian K Baxter
(74) *Attorney, Agent, or Firm* — Muncy, Geissler, Olds & Lowe, P.C.

(57) ABSTRACT

A redundant power transfer apparatus provides an uninterrupted power transfer for a rear-stage circuit. The redundant power transfer apparatus includes a main loop switch coupled to a main power source, a standby loop switch coupled to a standby power source, and a control unit. The control unit controls the redundant power transfer apparatus to make the main power source or the standby power source supply power to the rear-stage circuit.

17 Claims, 6 Drawing Sheets

REDUNDANT POWER TRANSFER APPARATUS AND CONTROL METHODS

BACKGROUND

Technical Field

The present disclosure relates to a transfer apparatus and control methods, and more particularly to a redundant power transfer apparatus and control methods.

Description of Related Art

The statements in this section merely provide background information related to the present disclosure and do not necessarily constitute prior art.

At present, the redundant power system has been widely used in various data centers and server power input stages, and its purpose is to improve the reliability and flexibility of power supply. In recent years, under the requirements of system space and capacity utilization, the redundant circuits have been gradually integrated into the power supply unit from individual units. However, the existing redundant power system has the problems of large volume and high costs, and therefore it is not conducive to the design of integrated power supply.

SUMMARY

An objective of the present disclosure is to provide a redundant power transfer apparatus to solve the problems of low switching efficiency and high circuit costs.

In order to achieve the above-mentioned objective, the redundant power transfer apparatus provides an uninterrupted power transfer for a rear-stage circuit. The redundant power transfer apparatus includes a main loop switch, a standby loop switch, a first switch assembly, a second switch assembly, and a control unit. The main loop switch is coupled to a main power source. The standby loop switch is coupled to a standby power source. The first switch assembly is coupled to the main loop switch and the standby loop switch. The first switch assembly includes a first bidirectional switch and a first bypass switch coupled in parallel to the first bidirectional switch. The second switch assembly is coupled to the main loop switch and the standby loop switch. The second switch assembly includes a second bidirectional switch and a second bypass switch coupled in parallel to the second bidirectional switch. The control unit is configured to control the redundant power transfer apparatus so that the rear-stage circuit is supplied power by the main power source or the standby power source.

Accordingly, the redundant power transfer apparatus is provided to reduce the stress of the switches, increase the reliability of the switches, implement the miniaturization of the rear-stage circuit, and provide the sufficient hold-up time, and further the redundant power transfer apparatus is appropriately applied to the zero current switching control.

Another objective of the present disclosure is to provide a method of controlling a redundant power transfer apparatus to solve the problems of current stress of the switches and to reduce the switching time.

In order to achieve the above-mentioned objective, the method of controlling the redundant power transfer apparatus includes the steps of: (a) confirming that the main power source abnormally supplies power, (b) making the rear-stage circuit stop working, (c) turning off the first bidirectional switch, the second bidirectional switch, the first bypass switch, the second bypass switch, and the main loop switch, (d) turning on the standby loop switch, and (e) turning on the first bidirectional switch and the second bidirectional switch so that the standby power source starts to supply power to the rear-stage circuit.

Accordingly, the method of controlling the redundant power transfer apparatus is provided to reduce the stress of the switches, reduce the switching time of the redundant power transfer apparatus, increase the efficiency of transferring power source, implement the miniaturization of the rear-stage circuit, and provide the sufficient hold-up time, and further the redundant power transfer apparatus is appropriately applied to the zero current switching control.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
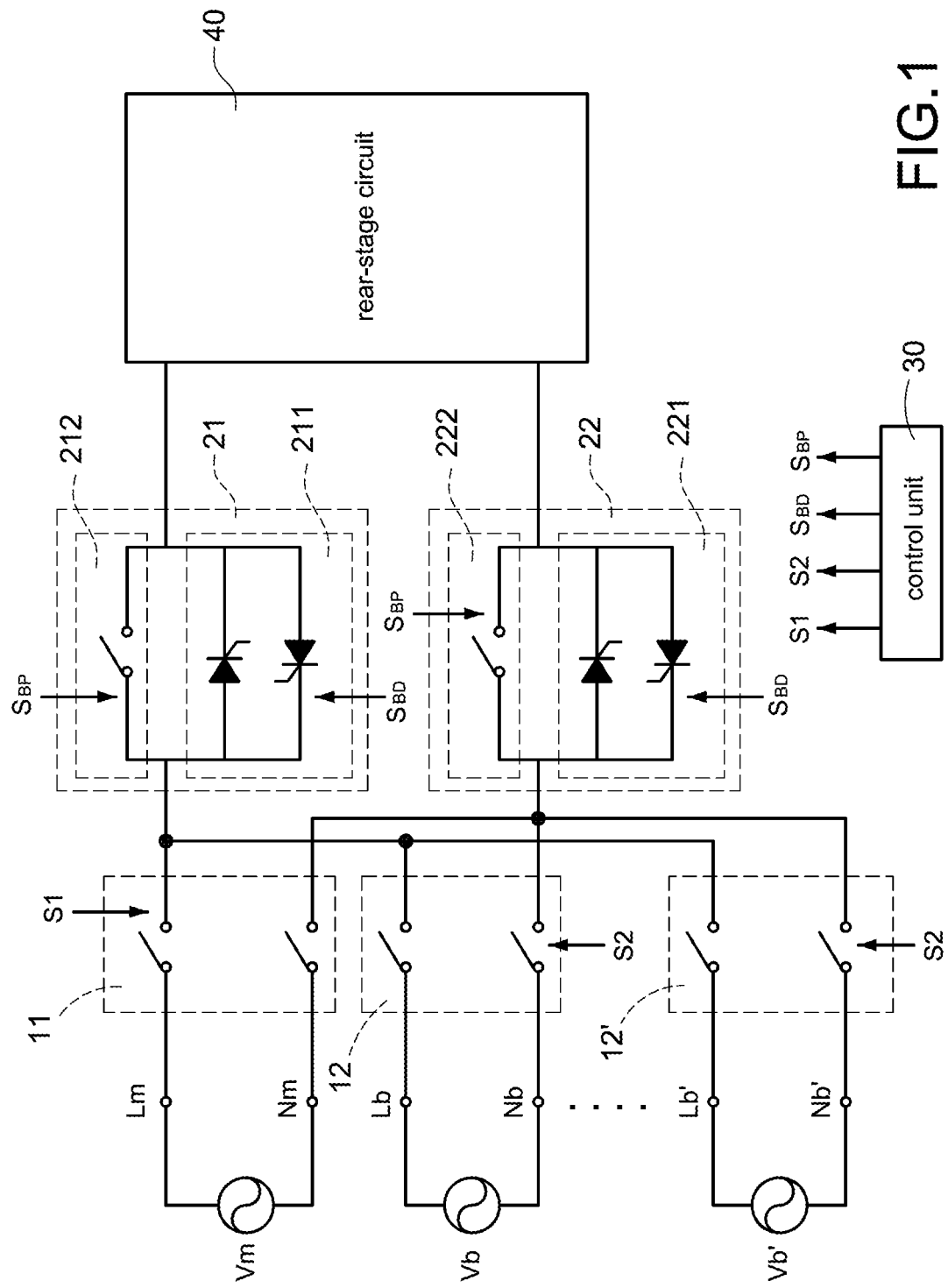
FIG. 1 is a block circuit diagram of a redundant power transfer apparatus according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a redundant power transfer apparatus according to the present disclosure. The redundant power transfer apparatus includes a main loop switch 11, a standby loop switch 12, a first switch assembly 21, a second switch assembly 22, and a control unit 30. The main loop switch 11 is coupled to a main power source Vm. The main power source Vm is, for example but not limited to, an AC utility or a generator for mainly providing the required power to a rear-stage circuit 40. The standby loop switch 12 is coupled to a standby power source Vb. The standby power source Vb is, for example but not limited to, another AC utility, another generator, or an AC power source converted from a renewable energy source, such as a solar energy source, a wind energy source, a hydraulic energy source, a geothermal energy source, or so on by a DC-to-AC conversion manner. When the main power source Vm is abnormal and fails to supply power to the rear-stage circuit 40, the standby power source Vb uninterruptedly continues to supply power to the rear-stage circuit 40 so that the rear-stage circuit 40 can normally work. As shown in FIG. 1, a plurality of standby power sources Vb, Vb' are provided as the standby power sources. For convenience, only one standby power source Vb is used as an example hereinafter.

The first switch assembly 21 is coupled to the main loop switch 11 and the standby loop switch 12. The first switch assembly 21 includes a first bidirectional switch 211 and a first bypass switch 212 coupled in parallel to the first bidirectional switch 211. The second switch assembly 22 is coupled to the main loop switch 11 and the standby loop switch 12. The second switch assembly 22 includes a second bidirectional switch 221 and a second bypass switch 222 coupled in parallel to the second bidirectional switch 221. In particular, the main loop switch 11, the standby loop switch 12, the first bypass switch 212, or the second bypass switch 222 may by a relay switch or a switch with the lower impedance. The first bidirectional switch 211 or the second bidirectional switch 221 is composed of two semiconductor switches which are connected in anti-parallel. Also, the semiconductor switch is, for example but not limited to, a metal-oxide-semiconductor field-effect transistor (MOSFET), an insulated gate bipolar transistor (IGBT), or a silicon-controlled rectifier (SCR).

The control unit 30 provides a plurality of switch signal to correspondingly control the foregoing switches. Specifically, the control unit 30 provides a first switch signal S1 to control the main loop switch 11, provides a second switch signal S2 to control the standby loop switch 12, provides a bidirectional switch signal $S_{BD}$ to control the first bidirectional switch 211 and the second bidirectional switch 221, and provides a bypass switch signal $S_{BP}$ to control the first bypass switch 212 and the second bypass switch 222.

The redundant power transfer apparatus further includes a power detection unit (not shown). The power detection unit is used to detect electric information of the main power source Vm, such as the voltage, current, frequency, or other parameters thereof. Moreover, the detected electric information is provided to the control unit 30, and therefore the control unit 30 can realize the power supplying condition of the main power source Vm. Similarly, the power detection unit is also used to detect electric information of the standby power sources Vb, and the detected electric information is provided to the control unit 30 so that the control unit 30 can realize the power supplying condition of the standby power sources Vb.

When the main power source Vm normally supplies power, the control unit 30 turns on the main loop switch 11, the first switch assembly 21, and the second switch assembly 22 so that the main power source Vm can supply power to a rear-stage circuit 40. On the contrary, when the main power source Vm fails to normally supply power, for example an abnormal loss-voltage condition or abnormal under-voltage condition occurs, the control unit 30 first turns off the first switch assembly 21 and the second switch assembly 22, and then turns off the main loop switch 11, and finally turns on the standby loop switch 12, the first switch assembly 21, and the second switch assembly 22 so that the rear-stage circuit 40 is disconnected from the abnormal main power source Vm. At this condition, the standby power source Vb uninterruptedly continues to supply power to the rear-stage circuit 40 so that the rear-stage circuit 40 can normally work.

Hereinafter, the operation of controlling the redundant power transfer apparatus under a normal start and under a power transfer will be described. Please refer to FIG. 2, which shows a timing waveform chart of controlling the redundant power transfer apparatus under a normal start according to the present disclosure. In addition, the switch signals are, for example but not limited to, in the high level to turn on switches and in the low level to turn off switches. In other words, the switches can be turned on by the switch signals with low level and turned off by the switch signals with high level according to actual circuit designs. When the control unit 30 realizes that the main power source Vm normally supplies power, the control unit 30 provides the first switch signal S1 with high level to turn on the main loop switch 11 at a time point t1. Since the main power source Vm and the rear-stage circuit 40 are still decoupled at this time, the time point t1 can be arbitrary.

Afterward, when the control unit 30 confirms that the main power source Vm still normally supplies power, the control unit 30 provides the bidirectional switch signal $S_{BD}$ with high level at a time point t2 to simultaneously turn on the first bidirectional switch 211 and the second bidirectional switch 221 so that the main power source Vm starts to supply power to the rear-stage circuit 40. Since the main power source Vm is in a ready condition before the first bidirectional switch 211 and the second bidirectional switch 221 are turned on, and the first bidirectional switch 211 and the second bidirectional switch 221 are the semiconductor switches and its turned-on time point can be accurately controlled due to almost no circuit delay, the time point t2 is a time point when the main power source Vm is in the zero voltage condition so that the first bidirectional switch 211 and the second bidirectional switch 221 are turned on in a zero voltage condition. Correspondingly, no current flows through the first bidirectional switch 211 and the second bidirectional switch 221 in the zero voltage condition, thereby reducing the stress of the switches and increasing the reliability of the switches. At this condition, the main power source Vm can supply power to the rear-stage circuit 40.

Therefore, when the main power source Vm operates in the positive-half cycle, one supplying power path is formed by a live wire end Lm of the main power source Vm, the main loop switch 11, the first bidirectional switch 211, the rear-stage circuit 40, the second bidirectional switch 221, the main loop switch 11, and a neutral wire end Nm of the main power source Vm. On the contrary, when the main power source Vm operates in the negative-half cycle, another supplying power path is formed by the neutral wire end Nm of the main power source Vm, the main loop switch 11, the second bidirectional switch 221, the rear-stage circuit 40, the first bidirectional switch 211, the main loop switch 11, and the live wire end Lm of the main power source Vm.

Afterward, the control unit 30 further provides the bypass switch signal $S_{BP}$ with high level at a time point t3 to simultaneously turn on the first bypass switch 212 and the second bypass switch 222. Since the first bidirectional switch 211 and the second bidirectional switch 221 are in the turned-on condition before the first bypass switch 212 and the second bypass switch 222 are turned on, a very small turned-on voltage, about 0.2 to 0.7 volts, of the first bidirectional switch 211 or the second bidirectional switch 221 is across two ends of the first bypass switch 212 or the second bypass switch 222. At this condition, the first bypass switch 212 and the second bypass switch 222 are turned on by the control unit 30 under the very small across voltage so that a relatively small turned-on current instantaneously flows through the first bypass switch 212 and the second bypass switch 222, thereby reducing the stress of the switches and increasing the reliability of the switches.

Since an impedance value of the first bypass switch 212 and that of the second bypass switch 222 are much smaller than that of the first bidirectional switch 211 and that of the second bidirectional switch 221, a loop current flows through the first bypass switch 212 and the second bypass switch 222 instead of flowing through the first bidirectional switch 211 and the second bidirectional switch 221. Moreover, since the impedance value of the first bypass switch 212 and that of the second bypass switch 222 are much smaller than that of the first bidirectional switch 211 and that of the second bidirectional switch 221, it is not essential whether the first bidirectional switch 211 and the second bidirectional switch 221 are further controlled by the bidirectional switch signal $S_{BD}$ outputted from the control unit 30.

At this condition, when the main power source Vm operates in the positive-half cycle, one supplying power path is formed by the live wire end Lm of the main power source Vm, the main loop switch 11, the first bypass switch 212, the rear-stage circuit 40, the second bypass switch 222, the main loop switch 11, and the neutral wire end Nm of the main power source Vm. On the contrary, when the main power source Vm operates in the negative-half cycle, another supplying power path is formed by the neutral wire end Nm of the main power source Vm, the main loop switch 11, the second bypass switch 222, the rear-stage circuit 40, the first bypass switch 212, the main loop switch 11, and the live wire end Lm of the main power source Vm.

Figure 3A:
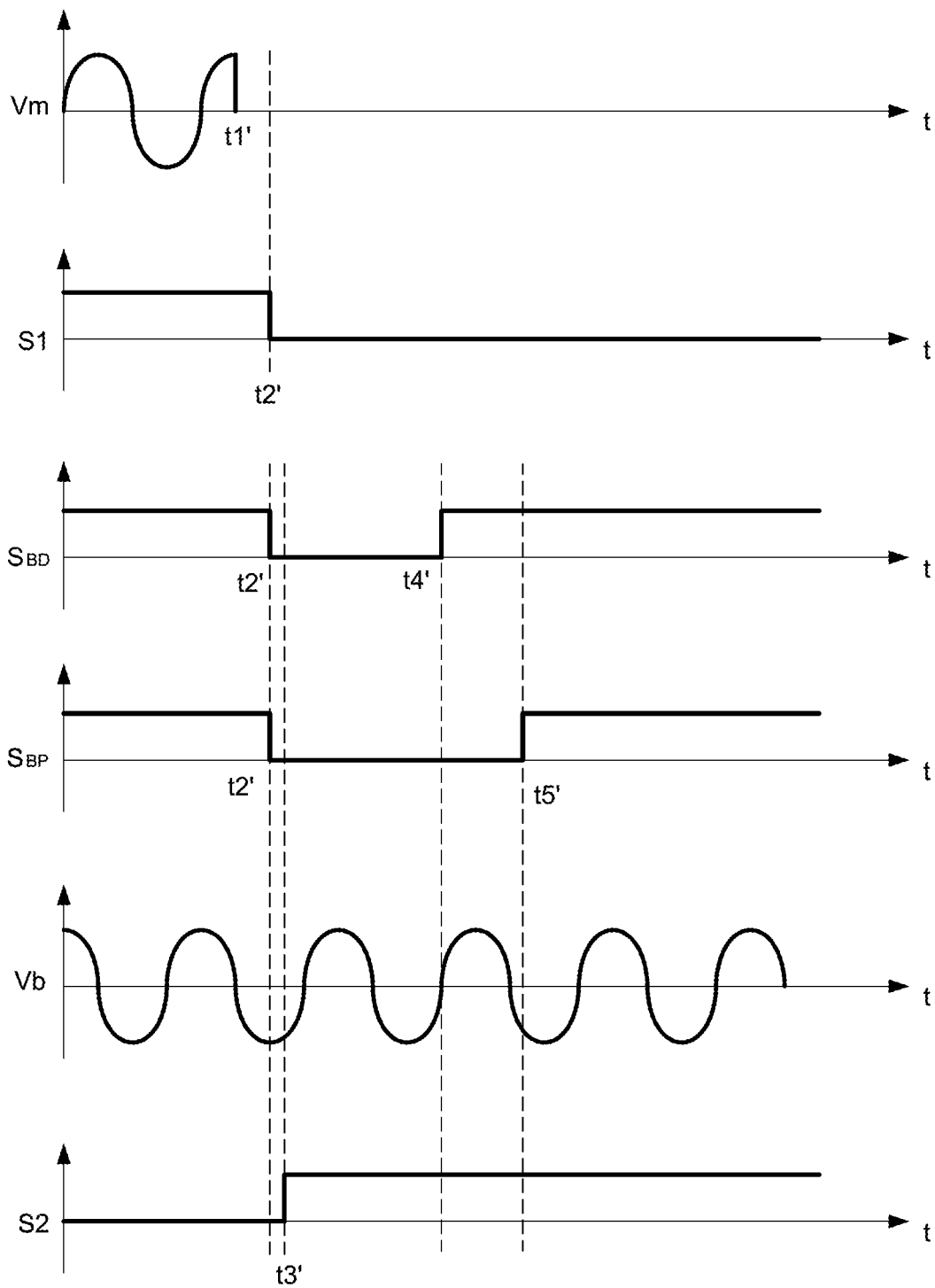
FIG. 3A is a timing waveform chart of transferring power supply of the redundant power transfer apparatus under an abnormal loss-voltage condition according to the present disclosure.

Please refer to FIG. 3A, which shows a timing waveform chart of transferring power supply of the redundant power transfer apparatus under an abnormal loss-voltage condition according to the present disclosure. The so-called "transferring power supply of the redundant power transfer apparatus under the abnormal loss-voltage condition" means that when the main power source Vm occurs the abnormal voltage loss, the standby power source Vb is transferred to uninterruptedly continue to supply power to the rear-stage circuit 40 so that the rear-stage circuit 40 can normally work. The detailed description will be made as follows.

Figure 2:
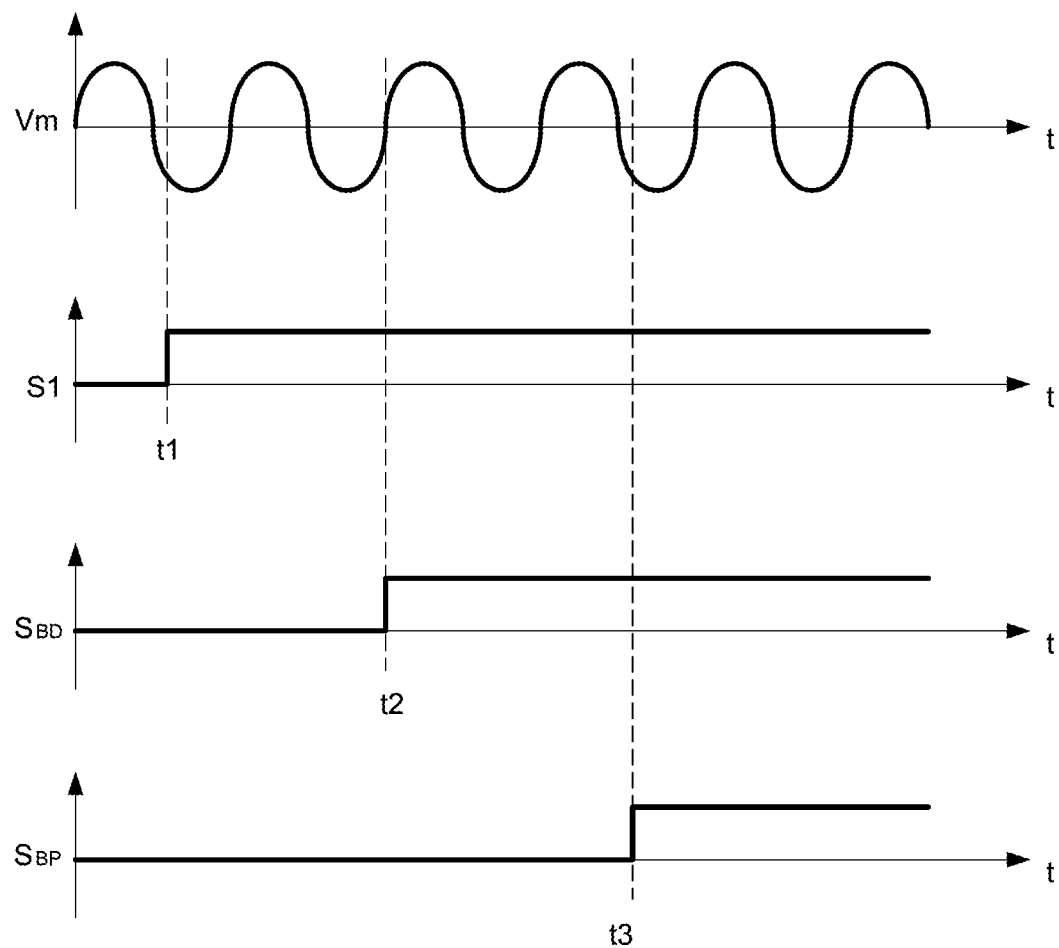
FIG. 2 is a timing waveform chart of controlling the redundant power transfer apparatus under a normal start according to the present disclosure.

Before a time point t1', the main power source Vm normally supplies power to the rear-stage circuit 40, as described in FIG. 2 and the corresponding content thereof. At this condition, before the time point t1', the first switch signal S1 with high level turns on the main loop switch 11, the bidirectional switch signal $S_{BD}$ with high level turns on the first bidirectional switch 211 and the second bidirectional switch 221, and the bypass switch signal $S_{BP}$ with high level turns on the first bypass switch 212 and the second bypass switch 222. In addition, the second switch signal S2 with low level turns off the standby loop switch 12.

At the time point t1', the power detection unit detects that the main power source Vm occurs the abnormal voltage loss. In particular, the control unit 30 can determine whether the loss-voltage condition is true or not. If the loss-voltage phenomenon is transient, i.e., the main power source Vm immediately restores to normally supply power after the transient loss-voltage phenomenon ends, the control unit 30 determines that the loss-voltage condition is not true. On the contrary, if the loss-voltage phenomenon continuously exists within a period of time, the control unit 30 determines that the loss-voltage condition is true. Therefore, at a time point t2', the control unit 30 provides the first switch signal S1 with low level to turn off the main loop switch 11, provides the bidirectional switch signal $S_{BD}$ with low level to turn off the first bidirectional switch 211 and the second bidirectional switch 221, and provides the bypass switch signal $S_{BP}$ with low level to turn off the first bypass switch 212 and the second bypass switch 222. Since the main power source Vm is in the abnormal loss-voltage condition, the foregoing switches may be simultaneously turned off or arbitrarily turned off by the control unit 30.

In other words, during a time interval between the time point t1' and the time pint t2', the control unit 30 confirms that the main power source Vm is in the abnormal loss-voltage condition, the control unit 30 decouples the supplying power path between the main power source Vm and the rear-stage circuit 40. Therefore, an output capacitor (also referred to as "bulk capacitor") of the rear-stage circuit 40, such as the power factor correction circuit can provide its stored energy to maintain the rear-stage circuit 40 still normally working within a sufficient hold-up time when the main power source Vm and the rear-stage circuit 40 are decoupled and the standby power source Vb has not been connected to supply power to the rear-stage circuit 40.

When the control unit 30 simultaneously turns off the main loop switch 11, the first bidirectional switch 211, the second bidirectional switch 221, the first bypass switch 212, and the second bypass switch 222 at the time point t2', the control unit 30 can further provide the second switch signal S2 with high level to turn on the standby loop switch 12 so that the standby power source Vb is in the standby condition. In practical applications, a delay time is introduced after the time point t2' and then for example at a time point t3', the standby loop switch 12 is turned on in order to avoid a short circuit occurs between the abnormal main power source Vm and the standby power source Vb. By a break-before-make switch control, different power sources are uninterruptedly transferred. Similarly, since the standby power source Vb and the rear-stage circuit 40 are still decoupled, the time point t3' can be arbitrary.

After the control unit 30 confirms that the standby power source Vb is in a standby condition, the control unit 30 provides the bidirectional switch signal $S_{BD}$ with high level to turn on the first bidirectional switch 211 and the second bidirectional switch 221 at a time point t4' so that the standby power source Vb starts to supply power to the rear-stage circuit 40. Since the standby power source Vb is in the standby condition before the first bidirectional switch 211 and the second bidirectional switch 221 are turned on, and the first bidirectional switch 211 and the second bidirectional switch 221 are the semiconductor switches and its turned-on time point can be accurately controlled due to almost no circuit delay, the time point t4' is a time point when the standby power source Vb is in the zero voltage condition so that the first bidirectional switch 211 and the second bidirectional switch 221 are turned on in the zero voltage condition. Correspondingly, no current flows through the first bidirectional switch 211 and the second bidirectional switch 221 in the zero voltage condition, thereby reducing the stress of the switches and increasing the reliability of the switches. At this condition, the standby power source Vb can supply power to the rear-stage circuit 40.

At this condition, when the standby power source Vb operates in the positive-half cycle, one supplying power path is formed by a live wire end Lb of the standby power source Vb, the standby loop switch 12, the first bidirectional switch 211, the rear-stage circuit 40, the second bidirectional switch 221, the standby loop switch 12, and a neutral wire end Nb of the standby power source Vb. On the contrary, when the standby power source Vb operates in the negative-half cycle, another supplying power path is formed by the neutral wire end Nb of the standby power source Vb, the standby loop switch 12, the second bidirectional switch 221, the rear-stage circuit 40, the first bidirectional switch 211, the standby loop switch 12, and the live wire end Lb of the standby power source Vb.

Afterward, the control unit 30 provides the bypass switch signal $S_{BP}$ with high level to turn on the first bypass switch 212 and the second bypass switch 222 at a time point t5'. Since the first bidirectional switch 211 and the second bidirectional switch 221 are in the turned-on condition before the first bypass switch 212 and the second bypass switch 222 are turned on, a very small turned-on voltage, about 0.2 to 0.7 volts, of the first bidirectional switch 211 or the second bidirectional switch 221 is across two ends of the first bypass switch 212 or the second bypass switch 222. At this condition, the first bypass switch 212 and the second bypass switch 222 are turned on by the control unit 30 under the very small across voltage so that a relatively small turned-on current instantaneously flows through the first bypass switch 212 and the second bypass switch 222, thereby reducing the stress of the switches and increasing the reliability of the switches.

Since the impedance value of the first bypass switch 212 and that of the second bypass switch 222 are much smaller than that of the first bidirectional switch 211 and that of the second bidirectional switch 221, the loop current flows through the first bypass switch 212 and the second bypass switch 222 instead of flowing through the first bidirectional switch 211 and the second bidirectional switch 221. Moreover, since the impedance value of the first bypass switch 212 and that of the second bypass switch 222 are much smaller than that of the first bidirectional switch 211 and that of the second bidirectional switch 221, it is not essential whether the first bidirectional switch 211 and the second bidirectional switch 221 are further controlled by the bidirectional switch signal $S_{BD}$ outputted from the control unit 30.

At this condition, the standby power source Vb operates in the positive-half cycle, one supplying power path is formed by the live wire end Lb of the standby power source Vb, the standby loop switch 12, the first bypass switch 212, the rear-stage circuit 40, the second bypass switch 222, the standby loop switch 12, and the neutral wire end Nb of the standby power source Vb. On the contrary, when the standby power source Vb operates in the negative-half cycle, another supplying power path is formed by the neutral wire end Nb of the standby power source Vb, the standby loop switch 12, the second bypass switch 222, the rear-stage circuit 40, the first bypass switch 212, the standby loop switch 12, and the live wire end Lb of the standby power source Vb.

Figure 3B:
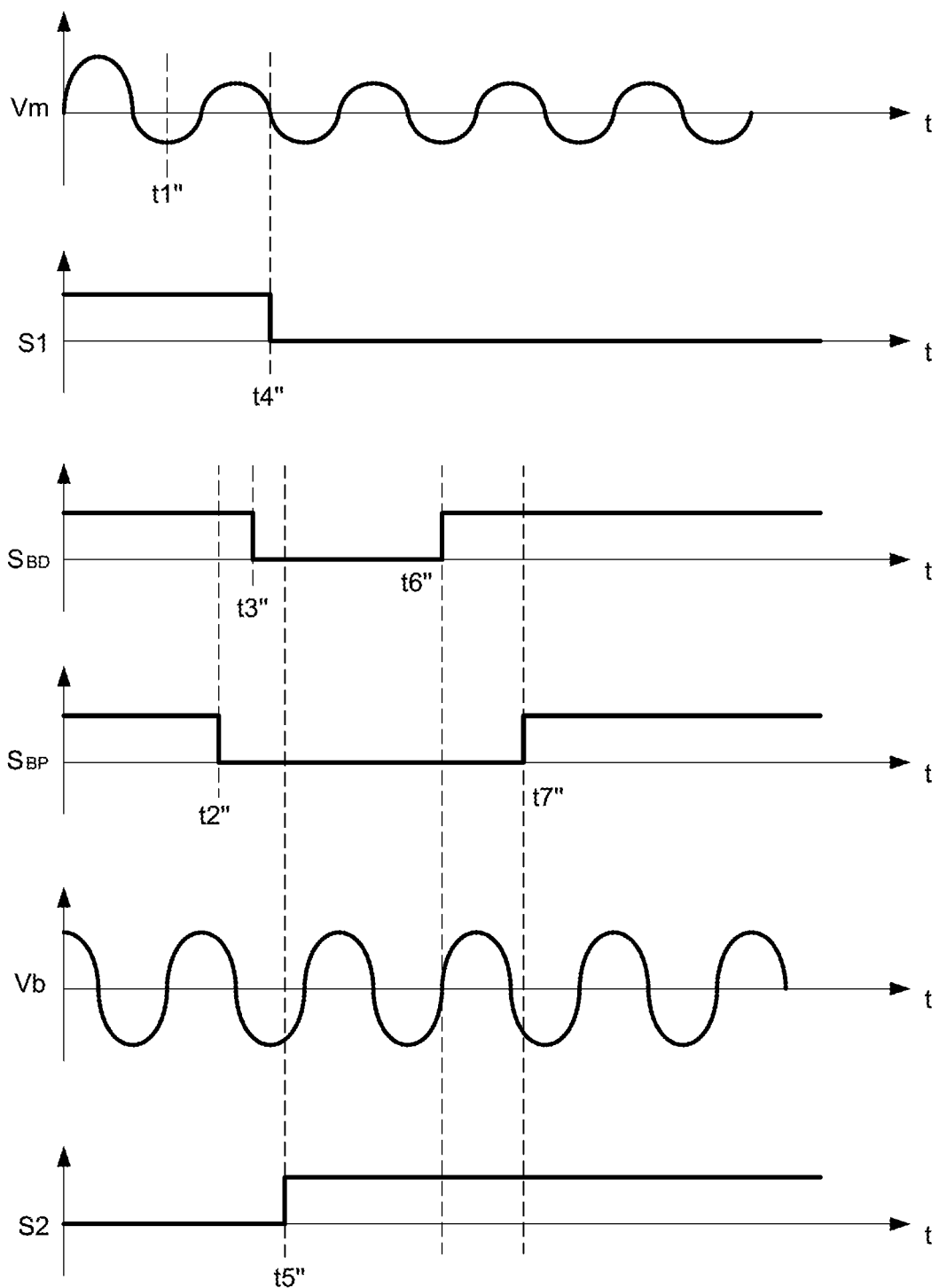
FIG. 3B is a timing waveform chart of transferring power supply the redundant power transfer apparatus under an abnormal under-voltage condition according to the present disclosure.

Please refer to FIG. 3B, which shows a timing waveform chart of transferring power supply the redundant power transfer apparatus under an abnormal under-voltage condition according to the present disclosure. The so-called "transferring power supply of the redundant power transfer apparatus under the abnormal under-voltage condition" means that when the main power source Vm occurs the abnormal under voltage, the standby power source Vb is transferred to uninterruptedly continue to supply power to the rear-stage circuit 40 so that the rear-stage circuit 40 can normally work. The same technical content in FIG. 3B and FIG. 3A is not repeated here for the sake of brevity.

Before a time point t1", the main power source Vm normally supplies power to the rear-stage circuit 40. At the time point t1", the power detection unit detects that the main power source Vm occurs the abnormal under voltage. In particular, the control unit 30 determines that the under-voltage phenomenon continuously exists within a period of time, the control unit 30 determines that the under-voltage condition is true. In other words, during a time interval between the time point t1" and a time pint t2", the control unit 30 decouples the supplying power path formed between the main power source Vm and the rear-stage circuit 40 after the control unit 30 confirms that the main power source Vm is in the abnormal under-voltage condition.

Therefore, at the time point t2", the control unit 30 first provides the bypass switch signal $S_{BP}$ with low level to turn off the first bypass switch 212 and the second bypass switch 222 since the voltage across the first bypass switch 212 or that across the second bypass switch 222 is smaller. Afterward, the control unit 30 provides the bidirectional switch signal $S_{BD}$ with low level to turn off the first bidirectional switch 211 and the second bidirectional switch 221 at a time point t3". Finally, the control unit 30 provides the first switch signal S1 with low level to turn off the main loop switch 11 at a time point t4". Accordingly, the supplying power path between the main power source Vm and the rear-stage circuit 40 is decoupled.

In practical applications, a delay time is introduced after the time point t4" and then for example at a time point t5", the control unit 30 provides the second switch signal S2 with high level to turn on the standby loop switch 12 so that the standby power source Vb is in the standby condition. After the control unit 30 confirms that the standby power source Vb is in the standby condition, the control unit 30 provides the bidirectional switch signal $S_{BD}$ with high level to turn on the first bidirectional switch 211 and the second bidirectional switch 221 at a time point t6", i.e., a time point when the standby power source Vb is in the zero voltage condition so that the standby power source Vb starts to supply power to the rear-stage circuit 40. Finally, the control unit 30 provides the bypass switch signal $S_{BP}$ with high level to turn on the first bypass switch 212 and the second bypass switch 222 at a time point t7". Accordingly, the standby power source Vb is transferred to uninterruptedly continue to supply power to the rear-stage circuit 40 so that the rear-stage circuit 40 can normally work when the main power source Vm occurs the abnormal under voltage.

In summary, the first bidirectional switch 211 and the second bidirectional switch 221 of the redundant power transfer apparatus can be turned on when the standby power source Vb is in the zero voltage condition, such as in the time point t4' shown in FIG. 3A or the time point t6" shown in FIG. 3B, thereby achieving the zero current switching control. Moreover, the first bidirectional switch 211 and the second bidirectional switch 221 can be turned on before the standby power source Vb is in the zero voltage condition, i.e., before the time point t4' or the time point t6". In other words, by the control of reducing switching time, the first bidirectional switch 211 and the second bidirectional switch 221 can be turned on under the non-zero voltage condition to achieve zero current switching. The detailed description will be made as follows.

Figure 4:
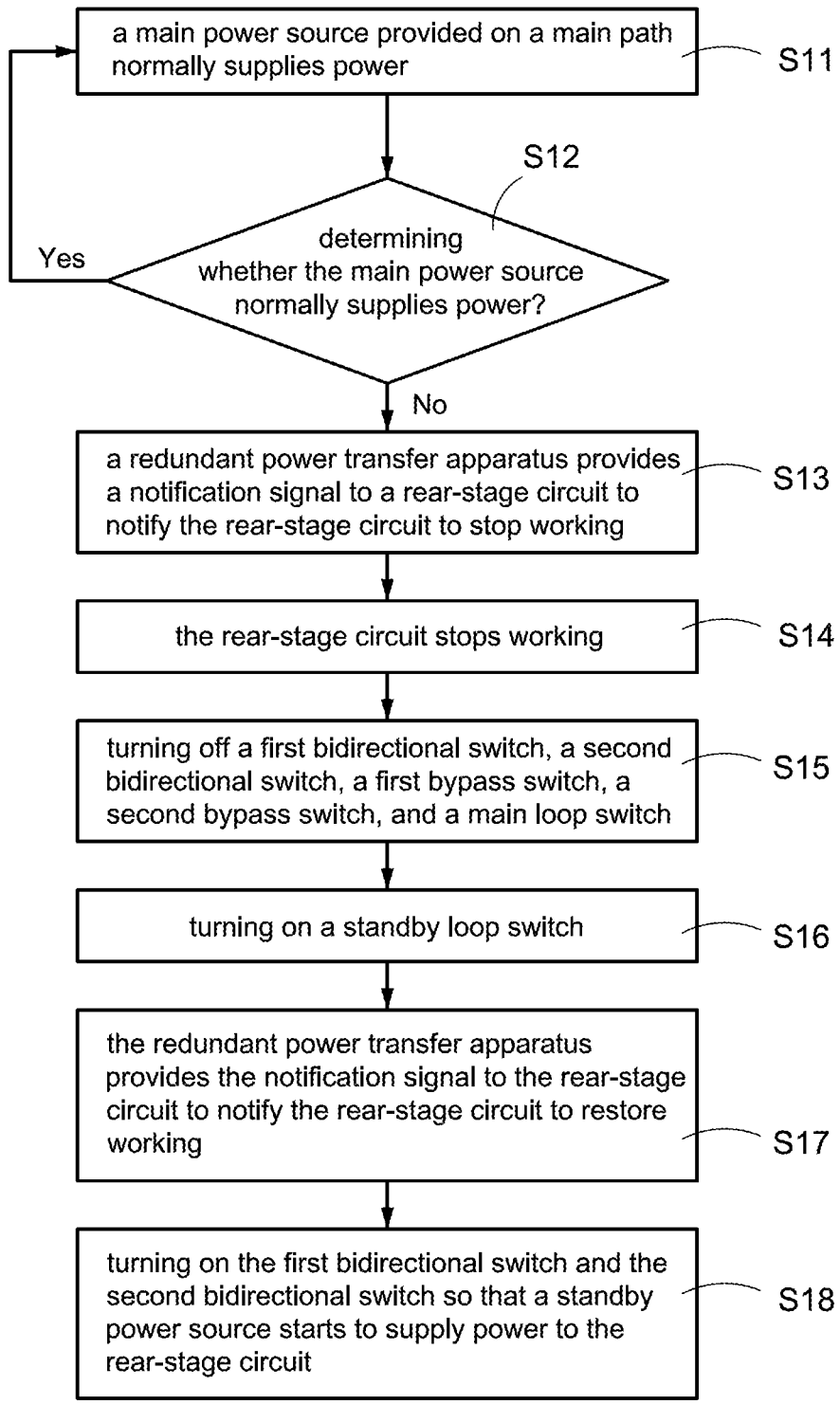
FIG. 4 is a flowchart of a method of controlling the redundant power transfer apparatus in a zero current switching manner according to a first embodiment of the present disclosure.

Please refer to FIG. 4, which shows a flowchart of a method of controlling the redundant power transfer apparatus in a zero current switching manner according to a first embodiment of the present disclosure. The first embodiment of performing the zero current switching control includes the steps as follows. When the main power source Vm provided on a main path normally supplies power (S11), the control unit 30 determines whether the main power source Vm normally supplies power (S12). If "Yes", the main power source Vm continuously supplies power to the rear-stage circuit 40. If "No", it means that the main power source Vm is abnormal. At this condition, the control unit 30 provides a notification signal to the rear-stage circuit 40 to notify the rear-stage circuit 40 to stop working (S13) so that the rear-stage circuit 40 stops working (S14) to be in a zero current condition.

Since the rear-stage circuit 40 is in the zero current condition, the control unit 30 provides the bidirectional switch signal $S_{BD}$ with low level to turn off the first bidirectional switch 211 and the second bidirectional switch 221, provides the bypass switch signal $S_{BP}$ with low level to turn off the first bypass switch 212 and the second bypass switch 222, and provides the first switch signal S1 with low level to turn off the main loop switch 11 (S15). Accordingly, a supplying power path between the main power source Vm and the rear-stage circuit 40 is decoupled. Moreover, the sequence of turning off the first bidirectional switch 211, the second bidirectional switch 221, the first bypass switch 212, the second bypass switch 222, and the main loop switch 11 is arbitrary and not limited since the rear-stage circuit 40 is in the zero current condition.

Afterward, the control unit 30 provides the second switch signal S2 with high level to turn on the standby loop switch 12 (S16). Afterward, the control unit 30 provides a notification signal to the rear-stage circuit 40 to notify the rear-stage circuit 40 to restore working (S17). Finally, the control unit 30 provides the bidirectional switch signal $S_{BD}$ with high level to turn on the first bidirectional switch 211 and the second bidirectional switch 221 so that the standby power source Vb starts to supply power to the rear-stage circuit 40 (S18). Accordingly, the standby power source Vb is transferred to uninterruptedly continue to supply power to the rear-stage circuit 40 so that the rear-stage circuit 40 can normally work.

Figure 5:
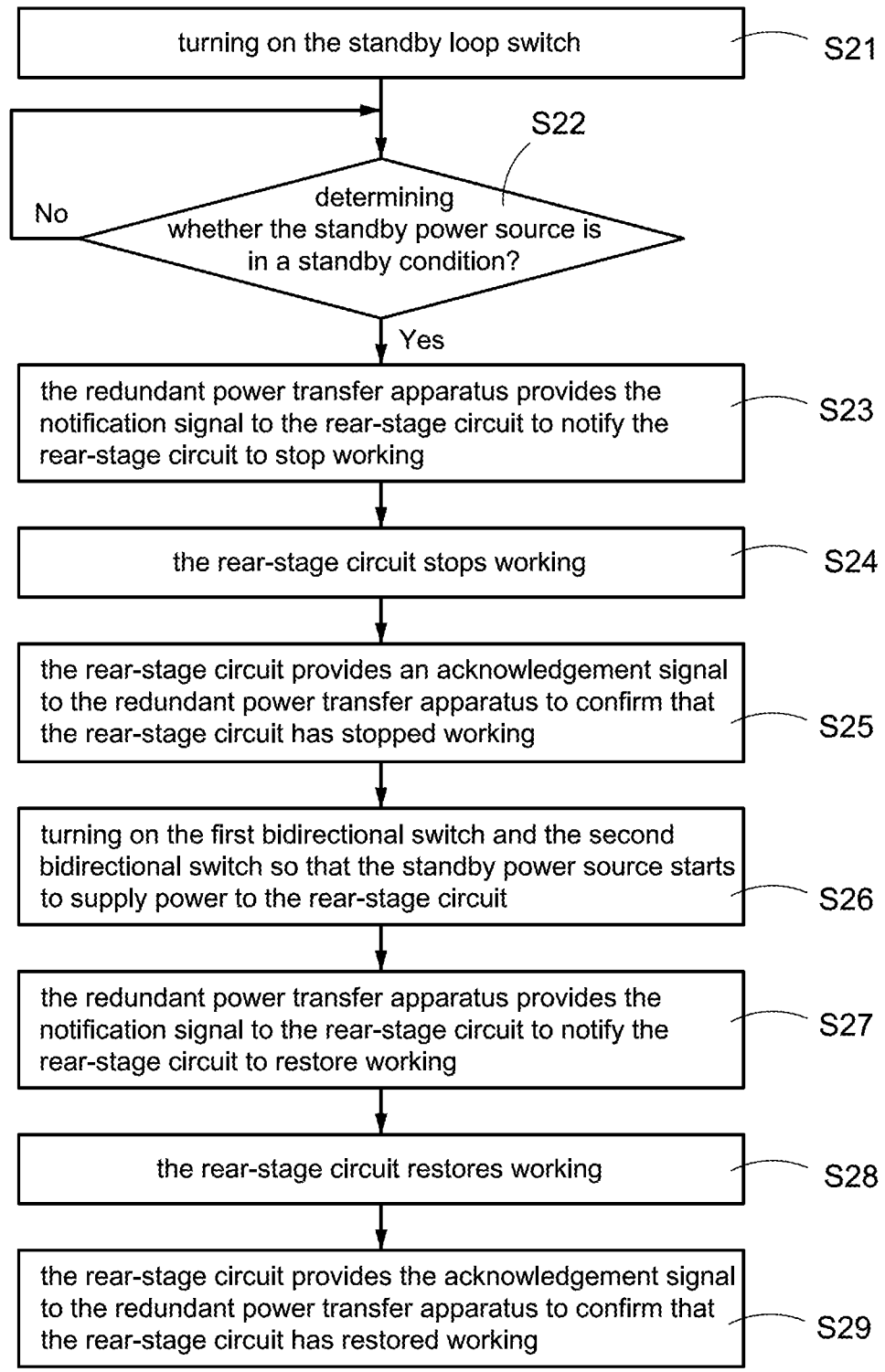
FIG. 5 is a flowchart of a method of controlling the redundant power transfer apparatus in the zero current switching manner according to a second embodiment of the present disclosure.

Please refer to FIG. 5, which shows a flowchart of a method of controlling the redundant power transfer apparatus in the zero current switching manner according to a second embodiment of the present disclosure. In order to reduce switching time to turn on the first bidirectional switch 211 and the second bidirectional switch 221 before the time point when the zero voltage condition occurs, the steps of the method includes as follows. After the standby loop switch 12 is turned on (S21), the control unit 30 determines whether the standby power source Vb is in the standby condition (S22). If "No", the step (S22) continuously performs. When the standby power source Vb is in the standby condition, i.e., the determination in the step (S22) is "Yes", the control unit 30 provides a notification signal to the rear-stage circuit 40 to notify the rear-stage circuit to stop working (S23) so that the rear-stage circuit 40 stops working (S24) to be in a zero current condition.

Incidentally, as shown in FIG. 4, the step (S13) and the step (S14) are performed after the main power source Vm is abnormal and fails to supply power, i.e., the determination in the step (S12) is "No". In comparison with FIG. 4, as shown in FIG. 5, the step (S23) and the step (S24) are performed after the standby power source Vb is in the standby condition, i.e., the determination in the step (S22) is "Yes".

After the rear-stage circuit 40 stops working (S24), the rear-stage circuit 40 provides an acknowledgement signal to the control unit 30 so that the control unit 30 confirms that the rear-stage circuit 40 has stopped working (S25). When the control unit 30 confirms that the rear-stage circuit 40 is in a zero current condition, the control unit 30 provides the bidirectional switch signal $S_{BD}$ with high level to turn on the first bidirectional switch 211 and the second bidirectional switch 221 so that the standby power source Vb starts to supply power to the rear-stage circuit 40 (S26), that is, the first bidirectional switch 211 and the second bidirectional switch 221 are turned on under the zero current condition. Afterward, the control unit 30 provides the notification signal to the rear-stage circuit 40 to notify the rear-stage circuit 40 to restore working (S27). After the rear-stage circuit 40 restores working (S28), the rear-stage circuit 40 provides the acknowledgement signal to the control unit 30 so that the control unit 30 confirms that the rear-stage circuit 40 has restored working (S29). Take a power factor correction circuit as the rear-stage circuit 40 for example, the notification signals and the acknowledgement signals transmitted between the control unit 30 of the redundant power transfer apparatus and the controller of the rear-stage circuit 40 (not shown), i.e., the power factor correction circuit is controlled to make the first bidirectional switch 211 and the second bidirectional switch 221 be turned on under the zero current condition. In other words, the power factor correction circuit stops working before the first bidirectional switch 211 and the second bidirectional switch 221 are turned on so that first bidirectional switch 211 and the second bidirectional switch 221 can be turned on under the zero current condition. Furthermore, the power factor correction circuit restores working after the first bidirectional switch 211 and the second bidirectional switch 221 are turned on under the zero current condition.

The time point of performing step (S21) corresponds to the time point t3' shown in FIG. 3A or the time point t5" shown in FIG. 3B, and the steps (S22)-(S29) are performed before the time point t4' shown in FIG. 3A or before the time point t6" shown in FIG. 3B. In particular, the time point t6" is a time point when the standby power source Vb is in the zero voltage condition. In other words, the first bidirectional switch 211 and the second bidirectional switch 221 can be turned on as long as the control unit 30 confirms that the standby power source Vb is in the standby condition and the rear-stage circuit 40 stops working without waiting for the zero voltage condition in which the standby power source Vb operates, thereby implementing the zero current switching and effectively reducing switching time. Accordingly, a time interval that the standby power source Vb has not been connected to the rear-stage circuit 40 can be significantly shortened after the main power source Vm and the rear-stage circuit 40 are decoupled, thereby reducing the capacity and volume of the output capacitor of the rear-stage circuit 40, implementing the miniaturization of the rear-stage circuit 40, and providing the sufficient hold-up time.

In conclusion, the present disclosure has following features and advantages:

1. The first bidirectional switch and the second bidirectional switch are turned on under the zero current condition so as to reduce the current stress of the switches and increase the reliability of the switches.

2. By the control of reducing switching time, the first bidirectional switch and the second bidirectional switch are turned on before the time point when the zero voltage condition occurs to achieve zero current switching.

3. By the control of reducing switching time, the capacity and volume of the output capacitor of the rear-stage circuit can be reduced, the miniaturization of the rear-stage circuit can be implemented, and the sufficient hold-up time can be provided.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A redundant power transfer apparatus configured to provide an uninterrupted power transfer for a rear-stage circuit, the redundant power transfer apparatus comprising:
   a main loop switch coupled to a main power source,
   a standby loop switch coupled to a standby power source,
   a first switch assembly coupled to the main loop switch and the standby loop switch, the first switch assembly comprising:
      a first bidirectional switch, and
      a first bypass switch coupled in parallel to the first bidirectional switch,
   a second switch assembly coupled to the main loop switch and the standby loop switch, the second switch assembly comprising:
      a second bidirectional switch, and
      a second bypass switch coupled in parallel to the second bidirectional switch, and
   a control unit,
   wherein the control unit is configured to provide switch signals to correspondingly control at least the first bidirectional switch, the first bypass switch, the second bidirectional switch, and the second bypass switch to control the redundant power transfer apparatus so that the rear-stage circuit is supplied power by the main power source or the standby power source,
   wherein when the main power source abnormally supplies power, the control unit is configured to first turn off the main loop switch, the first bidirectional switch, the second bidirectional switch, the first bypass switch, and the second bypass switch, and then turn on the standby loop switch, and then turn on the first bidirectional switch and the second bidirectional switch, and then turn on the first bypass switch and the second bypass switch.

2. The redundant power transfer apparatus of claim 1, wherein the control unit is configured to provide a first switch signal, a second switch signal, a bidirectional switch signal, and a bypass switch signal,
   wherein the main loop switch is controlled by the first switch signal, the standby loop switch is controlled by the second switch signal, the first bidirectional switch and the second bidirectional switch are controlled by the bidirectional switch signal, and the first bypass switch and the second bypass switch are controlled by the bypass switch signal.

3. The redundant power transfer apparatus of claim 1, wherein the rear-stage circuit stops working before the main loop switch, the first bidirectional switch, the second bidirectional switch, the first bypass switch, and the second bypass switch are turned off.

4. The redundant power transfer apparatus of claim 3, wherein the control unit is configured to provide a notification signal to the rear-stage circuit based on the status of the main power source.

5. The redundant power transfer apparatus of claim 1, wherein the rear-stage circuit stops working after the standby loop switch is turned on and before the first bidirectional switch and the second bidirectional switch are turned on.

6. The redundant power transfer apparatus of claim 1, wherein the control unit is configured to provide a notification signal to the rear-stage circuit to notify the rear-stage circuit to stop working.

7. The redundant power transfer apparatus of claim 1, wherein the main loop switch, the standby loop switch, the first bypass switch, or the second bypass switch is a relay switch.

8. The redundant power transfer apparatus of claim 1, wherein the first bidirectional switch or the second bidirectional switch is composed of two semiconductor switches connected in anti-parallel.

9. The redundant power transfer apparatus of claim 8, wherein the semiconductor switch is a metal-oxide-semiconductor field-effect transistor, an insulated gate bipolar transistor, or a silicon-controlled rectifier.

10. The redundant power transfer apparatus of claim 1, wherein the rear-stage circuit is a power factor correction circuit.

11. The redundant power transfer apparatus of claim 1, wherein the standby power source is an AC standby power source which is converted from a renewable energy.

12. A method of controlling a redundant power transfer apparatus providing an uninterrupted power transfer for a rear-stage circuit, the redundant power transfer apparatus comprising a main loop switch, a standby loop switch, a first bidirectional switch, a first bypass switch, a second bidirectional switch, and a second bypass switch, the method of controlling the redundant power transfer apparatus comprising the steps of:
   (a) confirming that a main power source abnormally supplies power,
   (b) making the rear-stage circuit stop working,
   (c) turning off the first bidirectional switch, the second bidirectional switch, the first bypass switch, the second bypass switch, and the main loop switch,
   (d) turning on the standby loop switch, and
   (e) turning on the first bidirectional switch and the second bidirectional switch so that a standby power source starts to supply power to the rear-stage circuit.

13. The method of controlling the redundant power transfer apparatus of claim 12, wherein step (b) is performed before step (d), and before step (b) comprising the step of:
   providing, by the redundant power transfer apparatus, a notification signal to the rear-stage circuit to notify the rear-stage circuit to stop working.

14. The method of controlling the redundant power transfer apparatus of claim 13, wherein step (e) is performed after step (d), and before step (e) comprising the step of:
   providing, by the redundant power transfer apparatus, the notification signal to the rear-stage circuit to notify the rear-stage circuit to restore working.

15. The method of controlling the redundant power transfer apparatus of claim 12, wherein step (b) is performed after step (d), and before step (b) and after step (d) comprising the steps of:
   (d1) confirming that the standby power source is in a standby condition, and
   (d2) providing, by the redundant power transfer apparatus, a notification signal to the rear-stage circuit to notify the rear-stage circuit to stop working.

16. The method of controlling the redundant power transfer apparatus of claim 15, wherein step (e) is performed after step (d), and after step (b) and before step (e) comprising the step of:
- (d21) providing, by the rear-stage circuit, an acknowledgement signal to the redundant power transfer apparatus to confirm the rear-stage circuit to stop working.

17. The method of controlling the redundant power transfer apparatus of claim 16, wherein after step (e) comprising the steps of:
- (e1) providing, by the redundant power transfer apparatus, the notification signal to the rear-stage circuit to notify the rear-stage circuit to restore working,
- (e2) making the rear-stage circuit restore working, and
- (e3) providing, by the rear-stage circuit, the acknowledgement signal to the redundant power transfer apparatus to confirm the rear-stage circuit to restore working.

* * * * *